Feb. 15, 1966 R. G. SMITH 3,235,272
AUXILIARY, EXTERNAL, PRESSURE SEAL FOR SHANK OF PLUG VALVE
Filed April 22, 1963 3 Sheets-Sheet 1

INVENTOR.
RUSSELL G. SMITH
BY
*J. Warren Kinney Jr.*
ATTORNEY

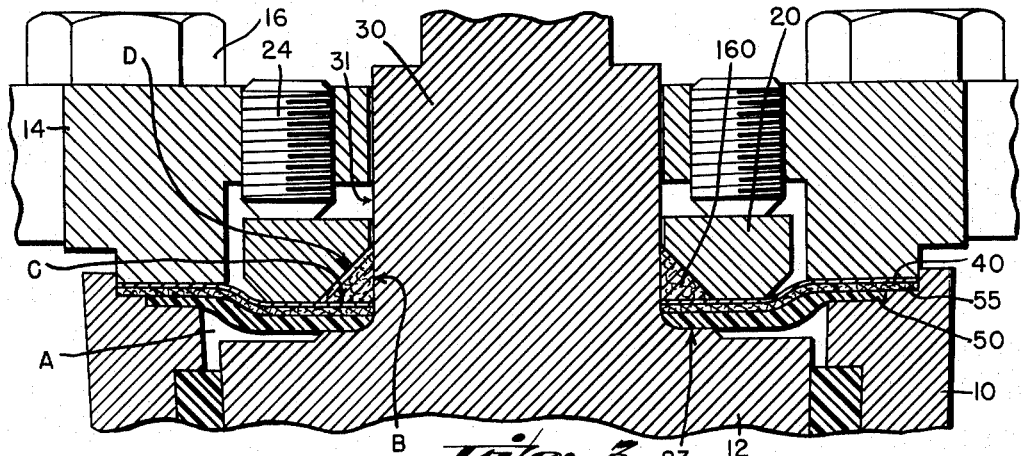
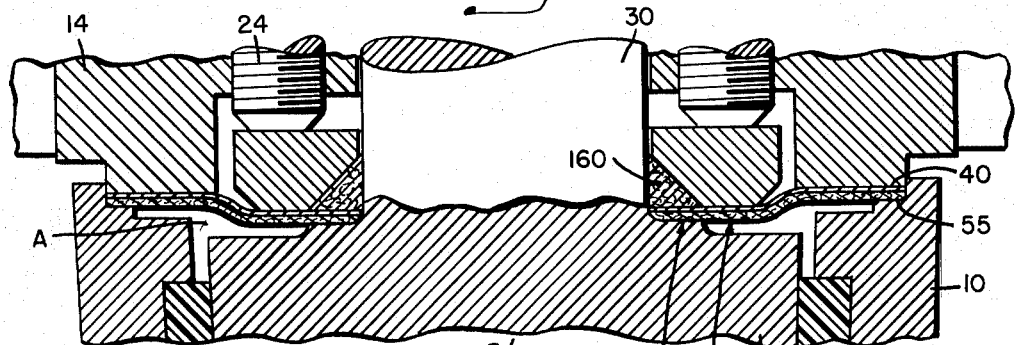
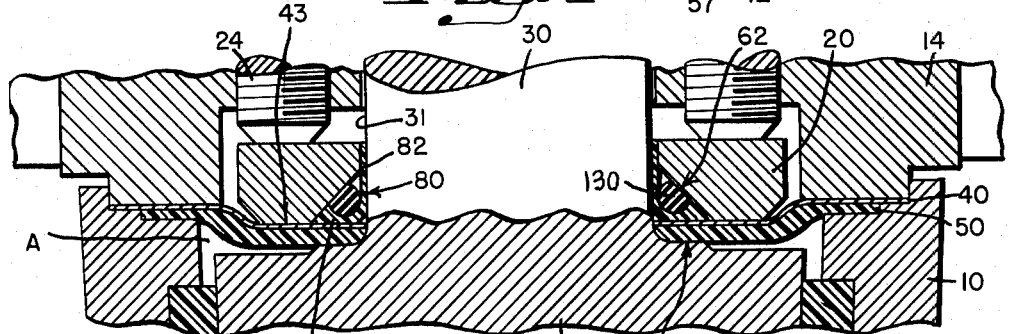
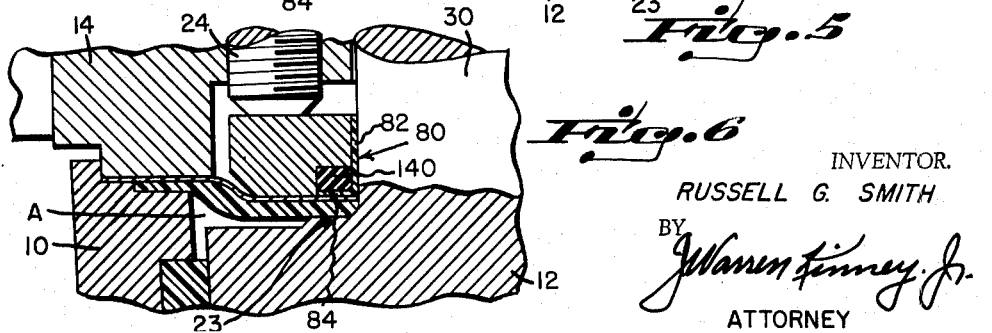
INVENTOR.
RUSSELL G. SMITH
BY
ATTORNEY

INVENTOR.
RUSSELL G. SMITH
BY
ATTORNEY

United States Patent Office 3,235,272
Patented Feb. 15, 1966

3,235,272
AUXILIARY, EXTERNAL, PRESSURE SEAL FOR SHANK OF PLUG VALVE
Russell G. Smith, Cincinnati, Ohio, assignor to Continental Manufacturing Company, Cincinnati, Ohio, a corporation of Ohio
Filed Apr. 22, 1963, Ser. No. 274,614
8 Claims. (Cl. 277—58)

This invention relates to valves, and in particular to plug valves.

A primary object of the invention is to provide a positive leakage seal to the atmosphere, and in particular to provide a simple yet extremely effective and highly efficient external seal for that portion of the plug shank immediately above and adjacant the diaphragm seal at the upper end of a plug valve.

Another object of the invention is to provide sealing means exteriorly of the shank of a plug which means are adapted to cooperate with and augment the conventional "interior" seal at the upper end of a plug.

A further object of the invention is to provide sealing means which are indestructable and which remain fully operative even when subjected to temperatures sufficient to cause vaporization and dissipation of conventional sealing media such as, by way of example, plastic sealing material from the group consisting of polyethylene and its halogen substitute products.

Still a further object of the invention is to provide auxiliary sealing means to establish a positive leakage seal to the atmosphere, which may be associated with a standard or conventional plug valve without requiring modification thereof.

These and other objects are attained by the means described herein and as disclosed in the accompanying drawings in which:

FIG. 3 is a sectional view similar to FIG. 2 wherein the sealing means includes a sealing ring and an additional diaphragm each of which is formed from a heat resistant material such as, by way of example, asbestos, or the like.

FIG. 4 is a view similar to FIG. 3 showing the relationship of the valve parts as they will exist after the conventional plastic diaphragm has been dissipated such as, by way of example, by the heat of a fire.

FIG. 5 is a view similar to FIG. 2 but illustrating a modified form of shank seal.

FIG. 6 is a view similar to FIG. 5 illustrating a modification thereof.

Figure 1:
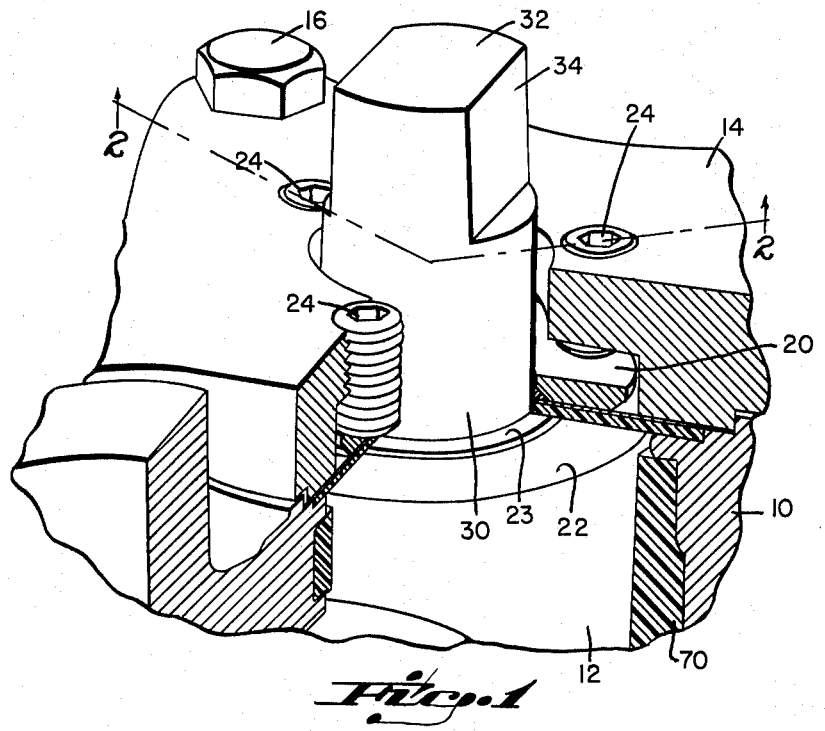
FIG. 1 is a perspective view of the upper portion of a typical plug valve, with parts being broken away for illustrating certain details of the present invention.

With reference now to the drawings, the numeral 10 denotes the body, 12 the rotatable plug and 14 a cover plate which is secured to and carried by the body by means of bolts 16.

A floating thrust collar, or gland 20 is interposed between portions of cover plate 14 and the upper end 22 of plug 12; said thrust collar being urged downwardly toward the upper end of the plug means of a plurality of set screws 24 which extend through and threadably engage the cover plate, as illustrated. In passing it should be noted that the thrust collar illustrated is centered by shank 30 of plug 12 whereby to effectively and automatically compensate for any misalignment. This construction is in contrast with a conventional gland of the type which, being threadably engaged by a valve cover, cannot compensate for plug and/or shank misalignment.

The numeral 30 denotes the shank of plug 12, said shank being circular in cross section, projecting upwardly from upper end 22 of the plug, and terminating in a free outer end 32 which may be provided with flats 34 to receive a suitable wrench, handle, or the like, not illustrated, for enabling an operator to impart a turning torque to the plug.

Figure 2:
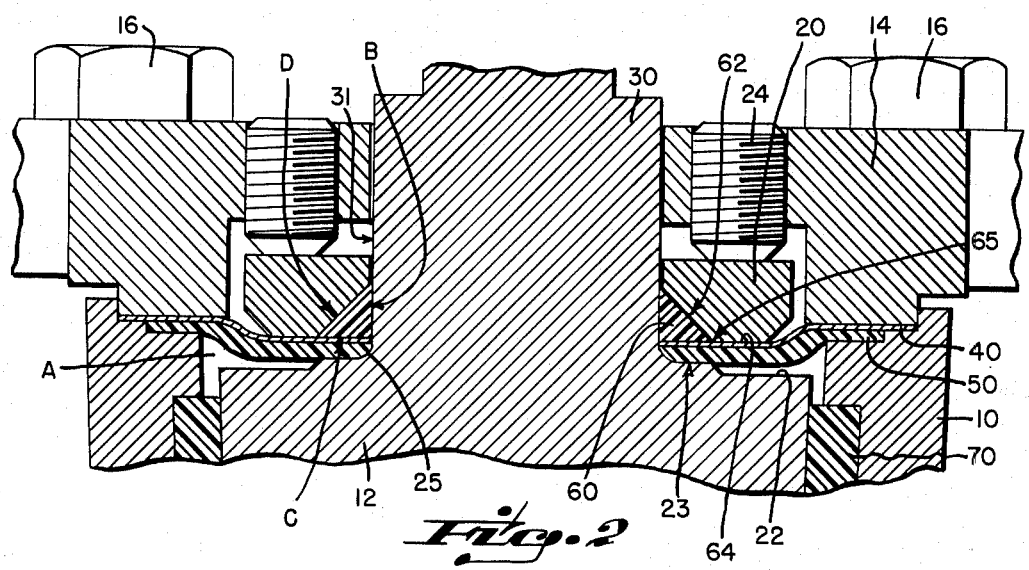
FIG. 2 is a sectional view taken on line 2—2 of FIG. 1.

With particular reference now to FIG. 2 it will be noted that the upper end 22 of plug 12 is provided with a raised shoulder 23 which extends radially from the lower end of shank 30 via fillet or transition zone 25.

The numeral 40 denotes a first, or metallic diaphragm and the numeral 50 a second, non-metallic diaphragm which diaphragms are provided with outer portions which are clampingly engaged by and between adjacent portions of cover plate 14 and the upper end of body 10 incident to the tightening of bolts 16.

Each diaphragm 40 and 50 is provided with a central aperture dimensioned to snugly receive and circumscribingly abut shank 30 adjacent to the shoulder 23.

Diaphragm 40 denotes generally what will hereinafter be referred to as the diaphragm seal at the top of a plug valve. Such a diaphragm seal is conventional in the plug valve art.

The auxiliary, external pressure seal of the present invention may comprise a sealing ring or member 60 having surfaces which selectively abut against adjacent surfaces of the shank 30, the upper or outer surface of diaphragm 40 and the inclined surface 62 of thrust collar 20. When the aforesaid surfaces of ring 60 have been disposed in positive, contacting sealing relationship with the aforesaid surfaces of the shank, diaphragm and thrust collar a positive external pressure seal will be provided which will effectively preclude leakage to the atmosphere of whatever media is being handled by the valve from the valve interior A along shank 30.

Uniformly satisfactory results have been obtained in those instances in which seal 60 is fabricated from a non-metallic plastic-material like or similar to that from which the second diaphragm 50 is fabricated.

With further reference to FIG. 2 it will be noted that sealing ring 60 approximates a right triangle, in vertical cross section, having a substantially vertical leg B, a substantially horizontal lower leg C and a third inclined leg D, comprising the hypotenuse. Inclined surface 62 of the thrust collar 20 is in substantial axial parallelism with leg D of seal 60; whereas lower surface 64 of the collar is in parallelism with lower leg C.

When thrust collar 20 is advanced downwardly toward the upper end of plug 12, lower face 64 of the collar will abut against a portion of the upper axial face of the first or diaphragm seal 40 at the top of the valve forcing said diaphragm downwardly against the second diaphragm 50 whose lower surface is thereby disposed in abutting relationship with shoulder 23 of the plug.

At the same time the outer surface of the lower leg C of seal ring 60 will be forced into abutting relationship with the upper surface of the first diaphragm 40 between the outer surface 31 of shank 30 and the inner edge 65 of the lower face 64 of collar 20; and surface B of the sealing ring will be forced into abutting relationship with and tightly against those portions 31 of shank 30 immediately above the first diaphragm 40.

The numeral 70 denotes generally a sleeve or liner which in some instances may be disposed between the valving surfaces of plug 12 and body 10; however, it should be understood that the external sealing means of the invention, heretofore described, may be utilized with plug valves, whether they be lined or unlined and/or whether they be of the lubricated or non-lubricated type.

In FIG. 3 the seal ring 60 of FIGS. 1 and 2 has been replaced with a seal ring 160 of a heat resistant material such as, by way of example, asbestos, or the like. Seal ring 160 is similar in shape and function to its counterpart 60 of FIG. 2 insofar as its sealing relationship with respect to shank 30, diaphragm 40 and collar 20 are concerned.

The structure of FIG. 3 further differs from that of FIG. 2 by reason of the presence of a third diaphragm 55 which is interposed between the first and second diaphragms 40 and 50 respectively. Uniformly satisfactory results have been obtained in those instances wherein the third diaphragm is fabricated from heat resistant material similar to that of sealing ring 160.

FIG. 3 illustrates the normal relationship of the various sealing elements of a valve when said valve is subjected to normal operating conditions.

FIG. 4 ilustrates the relationship of the various sealing elements of the valve of FIG. 3 as they will exist, and be positioned after and in the event that the second, or plastic diaphragm 50 has been dissipated such as, by way of example, will occur in the event that the valve should be subjected to the high temperatures of a fire. It should be noted that pressure within the valve body will cause the plug 12 to be shifted upwardly relative to body 10 and the other structural elements of the valve, whereby raised shoulder 23 will be urged upwardly toward and in contacting relationship with portions of lower surface 57 of the third diaphragm 55, for thereby producing and maintaining a positive, effective seal precluding the dissipation or passage of fluid media from the interior A of the valve housing outwardly along shank 30. Since the third diaphragm and sealing ring 160 are both fabricated from a heat resistant material the valve will remain tight and preclude the loss of fluid media therefrom via shank 30 in event the plastic sealing elements of the valve should be dissipated.

Figure 7:
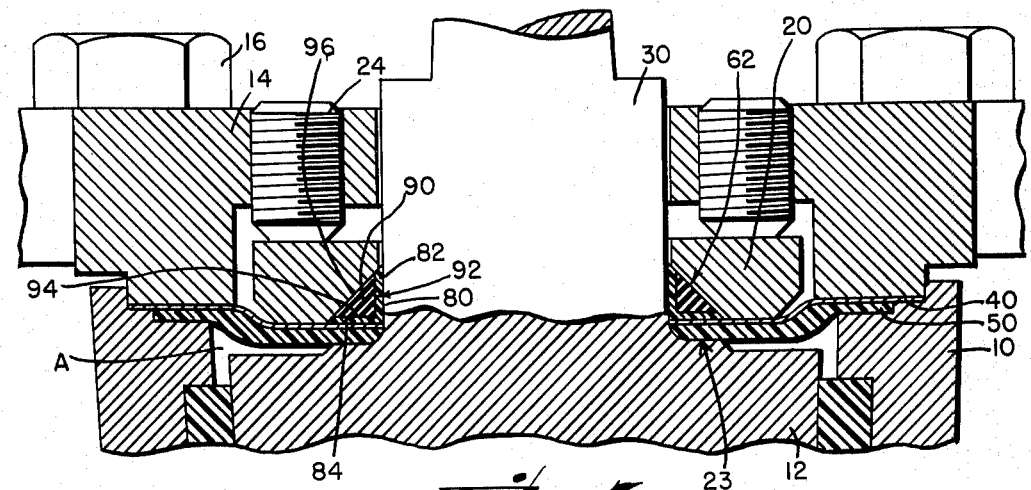
FIG. 7 is a view similar to FIG. 5 showing a further modification thereof.

With reference now to each of FIGS. 5, 6 and 7 it will be noted that a substantially L-shaped seal ring denoted generally by the numeral 80 and having an inner, upstanding substantially vertical leg 82 and a lower substantially horizontal leg 84 is provided between surface 31 of shank 30 of the plug and the shank-adjacent upper surface 43 of the first diaphragm 40.

In FIG. 5 the numeral 130 represents a sealing ring in the form of an O-ring which is received within and between the area defined by the intersection of legs 82 and 84, and in such a manner as to be engaged by inclined surface 62 of gland or collar 20.

In FIG. 6 a substantially rectangular O-ring 140 has been illustrated with portions thereof received between and disposed in abutting relationship with the inner portions of legs 82 and 84 of ring 80.

In FIG. 7 the numeral 90 represents a sealing ring having a substantially right-triangular cross section and having a substantially vertical inner surface 92, a substantially horizontal lower surface 94 and an inclined surface 96. Surfaces 92 and 94 are adapted to abuttingly engage the adjacent surface of vertical leg 82 and horizontal leg 84 of the L-shaped sealing member 80, whereas inclined surface 96 is adapted to be engaged by inclined surface 62 of the gland or collar 20.

Uniformly satisfactory results have been obtained in those instances wherein the L-shaped sealing members 80 have been fabricated from plastic material of the group consisting of polyethelene and its halogen substitute product characterized by high anti-frictional properties and which are substantially resistant to corrosives and solvents such as by way of example, Teflon.

Sealing members such as 130, 140 and 90 may be fabricated from a substance such as, by way of example, synthetic rubber which is characterized by its greater resiliance and ability to rapidly return to its original dimensions if and when released from compressive force, than, say, Teflon.

In the modifications illustrated in FIGS. 5, 6 and 7 the sealing members 130, 140 and 90 are utilized, by reason of their inherent resiliance and ability to uniformly transmit compressive forces to the adjacent surfaces of the legs 82 and 84 of the L-shaped seal members 80, the outer surfaces of which latter members are thereby urged against and maintained in positive abutting relationship with portions of diaphragm seal at the top of the valve and shank 30 of plug 12.

Figure 8:
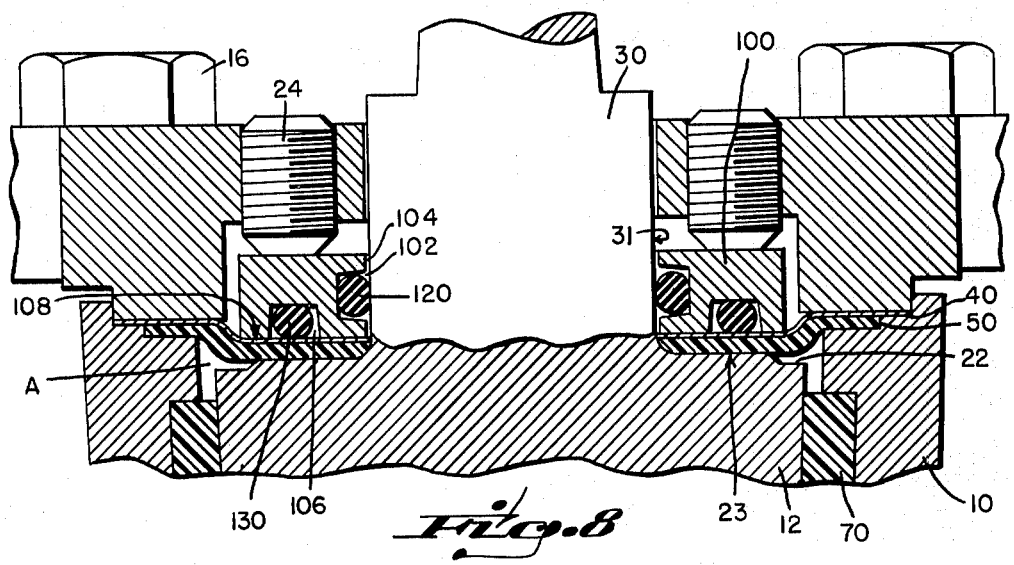
FIG. 8 is a view similar to FIG. 2 illustrating an additional modified form of shank seal.

In FIG. 8 the numeral 100 indicates a rigid seal ring which has been provided with a first annular recess 102 in the inner, upstanding face 104, and a second annular recess 106 in the bottom surface 108. An O-ring 120 is receivable within annular recess 102 and an O-ring 130 is receivable within annular recess 106, whereby O-ring 120 will be disposed in abutting-sealing relationship with the outer surface 31 of shank 30 of O-ring 130 will be disposed in abutting-sealing relationship with portions of the diaphragm seal 40 at the top of the valve.

From the foregoing it will be noted that I have provided simple yet highly effective external, pressure sealing means for preventing leakage to the atmosphere via seepage around the shank of a valve plug.

It should be understood that various changes and modifications may be made, in the structural details of the device within the scope of the appended claims, without departing from the spirit of the invention.

What is claimed is:

1. In a rotary plug valve assembly, a body having a rotary plug therein and a cover plate secured thereon over and in spaced relation with the top of the plug, the plug having a shank extending from the top thereof through an opening in the cover plate, the plug further having a relatively wide upwardly facing shoulder extending widthwise from the shank a distance short of the outside edge of the plug, a diaphragm seal overlying the top of the plug and peripherally secured between said cover and said body and having a central opening through which the plug shank extends, the diaphragm resting on said shoulder, an external pressure seal comprising an annular thrust collar encircling the plug and axially and radially spaced from said cover, the thrust collar having an inner corner bevel providing an inclined surface directed toward the shank and intersecting a flat radial lower surface portion of the collar, said inclined surface overlying said shoulder and said lower surface portion of the collar resting upon the diaphragm seal radially outwardly beyond the outer edge of the shoulder, the said bevel surface forming an annular recess with the shank and diaphragm seal surface, an annular seal in said recess and comprising first and second sealing rings, the first sealing ring being substantially L-shaped in vertical cross section and including an upstanding leg and a second leg normal to and extending outwardly from the lower end of the first leg, each of said legs having inner and outer surfaces, the outer surface of the upstanding leg bearing against the shank of the plug, the outer surface of the second leg resting upon the upper surface of the diaphragm seal, the second sealing ring being positioned in the angle between the inner surfaces of the legs of the first sealing ring and being positioned against the said inclined surface provided by said corner bevel, and means carried by said cover and bridging the space between the cover and said thrust collar and engaging the top of the collar for imposing thrust upon the collar toward the said top of the plug for maintaining said annular seal in sealing engagement with the shank and with the diaphragm seal.

2. The invention as defined by claim 1, wherein the said upstanding leg of the first sealing ring extends above the said corner bevel and is directly interposed between the thrust collar and the plug shank and in sealing engagement with the collar and shank.

3. In a rotary plug valve assembly a body having a rotary plug therein and a cover plate secured thereon over and in spaced relation with the top of the plug, the plug having a shank extending from the top thereof through an opening in the cover plate, the plug further having a relatively wide upwardly facing shoulder extending widthwise from the shank a distance short of the outer side edge of the plug, a diaphragm seal overlying the top of the plug and peripherally secured between said cover and said body and having a central opening through which the plug shank extends, the diaphragm resting on said shoulder, an external pressure seal comprising an annular thrust collar encircling the plug and axially and radially spaced from said cover, the thrust collar having the lower inner corner cut away forming a recess with the shank and the diaphragm seal, the recess lying directly over said shoulder and the lower surface of the collar radially outwardly of the recess resting upon the diaphragm seal beyond the outer edge of the shoulder, an annular seal surrounding the shank and comprising first and second sealing rings, the first sealing ring being substantially L-shaped in vertical cross section and including an upstanding leg and a second leg normal to and extending outwardly from the lower end of the first leg, each of said legs having inner and outer surfaces, the outer surface of the upstanding leg lying against the shank of the plug and the outer surface of the second leg lying upon the upper surface of the diaphragm seal, the inside angle of the legs receiving the recessd portion of the collar, said second sealing ring lying within said inside angle of the legs and in the recessed area of the collar and engaging inner surfaces of the first sealing ring and a surface of the cut away portion of the thrust collar, and means carried by said cover and bridging the space between the cover and said thrust collar and engaging the top of said thrust collar for imposing thrust thereon toward the said top of the plug for maintaining the seal in position relative to the plug shank and the sealing diaphragm, the said upstanding leg of the first sealing ring extends above the said recess and is directly interposed between the thrust collar and the plug shank and in sealing engagement with the collar and shank.

4. In a rotary plug valve assembly embodying a valve body having a cover plate secured thereon, a rotary plug in the body and having a top and a shank extending therefrom through said plate and a diaphragm on the top of the plug encircling said shank and secured between the body and the cover plate, a seal for the shank of the plug overlying the diaphragm and comprising first and second sealing rings, the first sealing ring being substantially L-shaped in vertical cross-section and including an upstanding leg and a second leg normal to and extending outwardly from the lower end of the first leg, said second sealing ring lying within said inside angle of the legs and engaging inner surfaces of the first sealing ring, and rigid means having an inclined surface extending downwardly and outwardly beyond said seal, and overlying said seal and diaphragm for imposing thrust against said seal rings axially and radially inwardly and against said diaphragm to effectively prevent passage of fluid from within the valve body along the top and side surfaces of the plug and shank respectively and between said rigid means and the diaphragm.

5. The invention according to claim 4, wherein said first sealing ring is formed of a plastic material from the group consisting of polyethylene and its halogen substitute products characterized by high anti-frictional properties and resistance to corrosives and solvents, said second sealing ring formed of a material characterized by its resiliency.

6. The invention as characterized in claim 4, wherein said diaphragm is formed of metal, a second diaphragm formed of plastic material from the group consisting of polyethylene and its halogen substitute products characterized by high anti-frictional properties and resistance to corrosives and solvents.

7. The invention as defined in claim 4, wherein said second sealing ring comprises an O-ring.

8. The invention according to claim 4, wherein a fillet joins the surface of the shoulder with the plug and the edge of the opening in the diaphragm seal is snugly positioned in said fillet and pressed therein by the pressure imposed by the thrust collar.

References Cited by the Examiner

UNITED STATES PATENTS

| | | | |
|---|---|---|---|
| 1,205,887 | 11/1916 | Guttner | 277—125 |
| 2,702,686 | 2/1955 | Fortune | 251—335.1 |
| 2,876,987 | 3/1959 | Renfro | 251—335.1 X |
| 2,905,489 | 9/1959 | Thompson et al. | 277—165 |
| 2,926,884 | 3/1960 | Clinkenbeard | 251—309 X |
| 2,935,365 | 5/1960 | Dega | 277—165 |
| 3,004,783 | 10/1961 | Webb | 277—124 X |
| 3,030,067 | 4/1962 | Manor | 251—214 |
| 3,057,630 | 10/1962 | Sneed | 277—165 |
| 3,071,386 | 1/1963 | Scannell | 277—188 X |
| 3,094,335 | 6/1963 | Shenk | 277—5 |
| 3,132,838 | 5/1964 | Smith | 251—214 |
| 3,157,381 | 11/1964 | Floyd | 251—214 |

FOREIGN PATENTS 1,142,734   1/1963   Germany.

LAVERNE D. GEIGER, *Primary Examiner.*

SAMUEL ROTHBERG, LEWIS J. LENNY, *Examiners.*